US008847438B2

(12) United States Patent
Steele et al.

(10) Patent No.: US 8,847,438 B2
(45) Date of Patent: Sep. 30, 2014

(54) MINIMUM LOSS AND WIRING CIRCUIT AND METHOD FOR PARALLELING HOT SWAP CONTROLLERS

(75) Inventors: Gerald W. Steele, Tucson, AZ (US); Tony R. Larson, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 1317 days.

(21) Appl. No.: 12/218,281

(22) Filed: Jul. 14, 2008

(65) Prior Publication Data
US 2010/0007217 A1 Jan. 14, 2010

(51) Int. Cl.
*H02J 1/00* (2006.01)
*H02J 1/10* (2006.01)

(52) U.S. Cl.
CPC ..................................... *H02J 1/102* (2013.01)
USPC ............................ 307/112; 307/131; 307/139

(58) Field of Classification Search
USPC .......................................... 307/112, 131, 139
See application file for complete search history.

(56) References Cited

U.S. PATENT DOCUMENTS

| | | | | |
|---|---|---|---|---|
| 4,398,252 | A * | 8/1983 | Frait ................. | 701/70 |
| 5,428,523 | A * | 6/1995 | McDonnal ................. | 363/71 |
| 5,672,958 | A * | 9/1997 | Brown et al. ................. | 323/269 |
| 5,861,737 | A * | 1/1999 | Goerke et al. ................. | 323/282 |
| 5,905,645 | A * | 5/1999 | Cross ................. | 363/65 |
| 6,127,882 | A * | 10/2000 | Vargha et al. ................. | 327/540 |
| 6,177,783 | B1 * | 1/2001 | Donohue ................. | 323/272 |
| 6,188,210 | B1 * | 2/2001 | Tichauer et al. ................. | 323/273 |
| 6,275,395 | B1 * | 8/2001 | Inn et al. ................. | 363/60 |
| 6,275,958 | B1 * | 8/2001 | Carpenter et al. ................. | 714/48 |
| 6,400,203 | B1 * | 6/2002 | Bezzi et al. ................. | 327/309 |
| 6,559,623 | B1 * | 5/2003 | Pardoen ................. | 323/274 |
| 6,608,402 | B2 * | 8/2003 | Soo et al. ................. | 307/52 |
| 6,642,631 | B1 * | 11/2003 | Clavette ................. | 307/52 |
| 6,724,598 | B2 * | 4/2004 | Segarra ................. | 361/93.8 |
| 6,917,503 | B2 * | 7/2005 | Dai et al. ................. | 361/93.1 |
| 7,005,924 | B2 * | 2/2006 | Can et al. ................. | 330/298 |
| 7,099,135 | B2 * | 8/2006 | Ball et al. ................. | 361/93.9 |
| 7,109,691 | B2 * | 9/2006 | Brooks et al. ................. | 323/282 |
| 7,282,899 | B1 * | 10/2007 | Daun-Lindberg et al. .... | 323/272 |
| 7,405,545 | B2 * | 7/2008 | Yang ................. | 323/269 |

(Continued)

OTHER PUBLICATIONS

"Passive Current Sharing Boosts Power and Reliability" by Barry Ehrman, Power Electronics Technology, Jan. 2005, pp. 58 and 60.

(Continued)

*Primary Examiner* — Adi Amrany
(74) *Attorney, Agent, or Firm* — John J. Patti; Frederick J. Telecky, Jr.

(57) ABSTRACT

A hot swap controller includes a shunt resistor (32-1,2) and a power transistor (37-1,2) having a source coupled to a load maintains the first power transistor in a fully-turned-on condition to cause it to deliver a load current contribution ($I_{L1,2}$) which flows through the shunt resistor and the power transistor to the load (25). Current sensing circuitry (35-1,2) produces a first control signal ($V_{45-1,2}-V_{47-1,2}$) equal to the difference between a DC component ($V_{47-1}$) proportional to a first load current contribution ($I_{L1}$) flowing in the first shunt resistor and a feedback-based component ($V_{45-1}$). A control amplifier (49-1,2) produces a second control signal ($V_{51-1,2}$) in response to the first control signal to modify a drive signal (53-1) to the power transistor so as to reduce a channel resistance of the power transistor if the first control signal exceeds a predetermined level.

23 Claims, 4 Drawing Sheets

(56) References Cited

U.S. PATENT DOCUMENTS

| | | | |
|---|---|---|---|
| 7,498,778 B2 * | 3/2009 | Seiersen | 323/269 |
| 7,508,641 B2 * | 3/2009 | Ball et al. | 361/100 |
| 7,554,305 B2 * | 6/2009 | Nunokawa et al. | 323/273 |
| 7,626,360 B2 * | 12/2009 | Melanson | 320/134 |
| 2002/0080544 A1 * | 6/2002 | Pellegrino | 361/93.9 |
| 2006/0171178 A1 * | 8/2006 | Shvarts | 363/65 |
| 2007/0109736 A1 * | 5/2007 | Coglitore | 361/683 |
| 2007/0188198 A1 * | 8/2007 | Bird | 327/63 |
| 2008/0165460 A1 * | 7/2008 | Whitby-Strevens | 361/86 |

OTHER PUBLICATIONS

"Hp Carrier Grade Blade Server bh3710 Site Preparation Guide", Edition 2.0, Manufacturing Part No. bh370_SitePrep, Jul. 2002, © /Copyright 2002-2004 Hewlett-Packard Development Company, L.P., pp. 1-46.

"Paralleling With Current Sharing and N+M Redundancy", Application Note 13, Rev. B, RO Associates, Inc., Oct. 5, 1995.

* cited by examiner

US 8,847,438 B2

MINIMUM LOSS AND WIRING CIRCUIT AND METHOD FOR PARALLELING HOT SWAP CONTROLLERS

BACKGROUND OF THE INVENTION

The present invention relates generally to hot swap controllers which can be inserted into and/or removed from a power supply system, such as the power supply system of a server back plane, to connect or disconnect power to a particular load while power continues to be supplied to the load by means of other hot swap controllers which are already plugged into the power supply system. More particularly, the invention relates to a hot swap controller that is capable of providing minimum voltage loss, minimum power dissipation, and maximum power utilization efficiency.

The closest prior art is believed to include the brochure "hp Carrier Grade Blade Server bh3710 Site Preparation Guide, Edition 2.0", copyright 2002-2004 by Hewlett-Packard Development Company, L. P., the publication "Passive Current Sharing Boosts Power and Reliability" by Berry Ehrman, Power Electronics Technology, pages 58 and 56, January, 2005, and the published Application Note 13, Rev B, by RO Associates, Inc. "Paralleling with Current Sharing and N+M Redundancy", pages 13-1 through 13-4, Oct. 5, 1995.

Prior Art FIG. 1 shows a power supply 1 which operates by means of passive load current sharing. A main DC power supply voltage $V_{DC}$ is applied to the power inputs of two regulated power supplies 2 and 3, designated Power Supply #1 and Power Supply #2, respectively. Power supplies #2 and #3 may be conventional DC-DC converters having $V_{DC}$ as a common input reference voltage (which typically might be 12 volts), or they may be DC switching power supplies on the back plane of a server rack.

The −Vout terminals of power supplies 2 and 3 are connected to a LOAD RETURN conductor 7. The +Vout terminal of power supply 2 is connected to the anode of a Schottky diode D1, the cathode of which is connected by conductor 4 to one terminal of a ballast resistor R1. The other terminal of ballast resistor R1 is connected by conductor 5 to a load (not shown). Similarly, the +Vout terminal of power supply 3 is connected to the anode of another Schottky diode D2, the cathode of which is connected by conductor 6 to one terminal of another ballast resistor R2. The other terminal of ballast resistor R2 is connected to load conductor 5. A load circuit (not shown) is connected between LOAD conductor 5 and LOAD RETURN conductor 7. The "passive load sharing" illustrated in FIG. 1 is accomplished by means of the circuitry including diodes D1 and D2 and resistors R1 and R2. For more information, see the above mentioned article by Ehrman. Power supply 1 typically is included on a PC board that also includes a particular load circuit, wherein the PC board would be inserted into the back plane, e.g., server back plane, of an equipment rack. Power supply 1 of FIG. 1 can be considered to be general prior art for passive current sharing. (It is believed that none of the known prior art current sharing is specific to hot swap controllers.)

In the past, ballast resistors such as R1 and R2 have been used in various current sharing circuits to accomplish approximately equal sharing of current from two or more power supplies (or other power-supplying elements such as power transistors). Each ballast resistor has one terminal coupled to the load and another terminal coupled to a power supply, respectively. The ballast resistor technique has been an effective way of providing relatively equal sharing of current from the two or more power-supplying elements, but suffers from the major disadvantage that a substantial amount of power is dissipated in the ballast resistors and therefore is wasted.

FIG. 2 shows a prior art n+1 redundant power supply system 10 which utilizes n the ballast resistors to achieve relatively equal sharing of load current from multiple power supplies or other current-supplying elements. In FIG. 2, an input power supply voltage or reference voltage $V_{DC}$ is applied to a power terminal of a typical server back plane 9 to which n power-supplying elements are connected. The main back plane supply voltage $V_{DC}$ is applied between back plane power bus conductors 11 and 12. Conductor 11 is coupled by fuses F1, F2 . . . Fn and conductors 13-1,2 . . . n to the +IN inputs of n power supplies 20-1, 20-2 . . . 20-n, respectively, which are illustrated as MICROVERTER™ DC-DC converters. Conductor 12 is connected to the −IN input of power supplies 20-1, 2 . . . n. A PDM 15-1 has a $V_{CC}$ terminal coupled by resistor R1 to conductor 13-1 and a ground terminal connected to conductor 12. (The term "PDM" is an abbreviation for "Paralleling De-Coupling Module", which is a trademark of RO Associates, author of the above mentioned published application note.) Similarly, a PDM 15-2 has a $V_{CC}$ terminal coupled by another resistor R1 to conductor 13-2 and a ground terminal connected to conductor 12, and a PDM 15-n has a $V_{CC}$ terminal coupled by another resistor R1 to conductor 13-n and a ground terminal connected to conductor 12. A "SHARE" terminal of each PDM is connected to the "SHARE" terminals of the other two. (The SHARE terminal has a function unique to the RO Associates PDM.). A bypass capacitor C4 is connected between the +IN and −IN terminals of each of power supplies 20-1, 2 . . . n, respectively. A "PAR" terminal of each of PDMs 15-1, 2 . . . n is connected to a corresponding PAR terminal of each of power supplies 20-1, 2 . . . n, respectively. (The PAR terminals are RO Associates terminology for the pins to be connected to each other to enable parallel operation of their DC-DC converters.)

For each of the power supplies 20-1, 2 . . . n, a "+SENSE" terminal is connected to a conductor 21, which is connected to one terminal of a load 25. A "−SENSE" terminal is connected to one terminal of a resistor R5 and one terminal of a resistor R6. The other terminal of resistor R5 is connected by conductor 22 to the other terminal of load 25. The other terminal of resistor R6 is connected to a +OUT terminal of the power supply and to the anode of a diode D2, the anode of which is connected to load 25 by means of conductor 22. This circuit does not use ballast resistors but rather depends more on the diodes D2, which also suffer excessive power losses. (For further information on the system of Prior Art FIG. 2, see the above mentioned publication "Paralleling With Current Sharing And N+M Redundancy", RO Associates, Inc., Application Note 13, Rev B, Oct. 5, 1995.

Unfortunately, the n+1 redundant power supply system 10 of Prior Art FIG. 2 has the shortcoming of high power dissipation loss which is unacceptable in state-of-the-art hot swap controller applications. The paralleling circuitry is complex and not readily adaptable in any form to hot swap controllers.

Hot swap controllers in blade servers typically are 40 ampere systems that connect a shunt resistor and power switching MOSFET (metal oxide semiconductor field effect transistor) in series with a 12 volt supply that comes from the back plane of a server rack to feed a server plugged into the rack. Voltage drops and associated wasted power dissipation in this path must be held to a minimum. Industry standards at the present time specify less than 30 millivolt drops across the power MOSFET, and existing hot swap current limiting circuitry causes additional drops of up to nearly 50 millivolts, for total a voltage drop of less than 80 millivolts at a 40 ampere level of load current. It would be desirable for future hot swap controller systems to reduce the voltage drop across the current-sensing shunt to 12 millivolts from the present 50 millivolt standard, lowering the total voltage drop to less than 42 millivolts. It should be noted that the total impedance of existing systems is on the order of 2 milliohms, and it is expected that the total output impedance will be reduced to roughly 1 milliohm in the not-too-distant future.

It should be appreciated that hot swap controllers and associated power MOSFETs usually operate in an environment in which only very low voltage drops can be tolerated, in order to prevent wasted power dissipation. It is very difficult in such an environment to connect multiple hot swap controllers in parallel such that they approximately equally share the total load current so as to avoid damage to edge connector pins of the circuit cards. In a typical server application (and any other typical high-current application), the amount of current being drawn may be, for example, roughly 40 amperes, and a FET (field effect transistor) that is used as a switch would normally be desired to have a source-to-drain voltage drop of roughly 30 millivolts with a drain current of about 40 amperes in a 12 volt DC system. That 30 millivolt source-drain voltage drop is typical of the presently acceptable amount of voltage loss in such state-of-the-art high current systems. Most of the prior art current sharing methods that have been used involve voltage drops of the order of 100 millivolts across all of the elements involved in accomplishing the current sharing, such as resistors, diodes, or combinations thereof. But in light of the present state-of-the-art system design and energy conservation considerations, that 100 millivolts voltage drop is roughly triple what would be desirable in the relatively near future.

A hot swap controller can be connected to and disconnected from the main power supply voltage in a back plane while the power is on. It is highly desirable that this be achieved without disrupting the regulated voltage being delivered to various circuitry included in the load that is being supplied by the back plane supply voltage. When a circuit card is inserted into a rack (e.g., into a server back plane) which continues to supply power to a number of other plugged-in circuit cards by means of various hot swap controllers, the power supply bypass capacitors usually provided on the circuit cards being inserted present a very low initial impedance that tends to momentarily short-circuit the back plane supply voltage. The resulting momentary decrease in the regulated supply voltage provided to the circuitry of the various already-plugged-in circuit cards may cause malfunctions in one or more of the already-plugged-in circuit cards. That could cause serious data errors, for example in a server application.

The term "pin" herein refers to the two edge connector leads or the like of the circuit card that conducts the "hot" +Vout voltage of each of power supplies 2 and 3 to load conductor 5 in order to prevent too much of the load current from flowing through a single edge connector lead. The term "pin" also refers to the two edge connector leads of the circuit card that conducts the −Vout voltage of each of power supplies 2 and 3 to load return conductor 7 in order to prevent too much of a load return current from flowing through a single edge connector lead.

One function of a hot swap controller is to limit the flow of current into the above mentioned bypass capacitors on the circuit board/card being plugged into the back plane to a sufficiently low level that the back plane voltage will not drop below its specified minimum value. If the current into the bypass capacitors is not sufficiently limited, the card edge pin conducting the unlimited current and/or the corresponding conductor of the socket into which the pin is plugged may be burned or damaged, causing a reliability problem.

The hot swap controller circuit also controls the ramping rate of its own output voltage. When its proper output voltage has been attained, the hot swap controller turns its output transistor (which typically is a switching MOSFET) completely on, and also provides a signal to the remainder of whatever system the hot swap controller is part of (which can be one of many types of systems, including server systems) to indicate that the back plane supply voltage is adequate for reliable operation of the various circuit cards.

Again, it must be emphasized that it is essential that the wasted power be minimized in server back plane and hot swap controller systems. It would be highly desirable to provide a hot swap controller in which the total current being supplied to the load is equally supplied by the two or more power supplies (or other current-supplying elements) without incurring nearly as much loss or waste of power as occurs in the ballast resistors of the closest prior art hot swap controllers.

For example, if the 12 volt pins in a typical prior art hot swap controller have a 42 millivolt difference at full current, that 42 millivolt difference is sufficient to cause all of the current to be "hogged" by the higher voltage pin, likely resulting in damage to that pin and the socket into which it is plugged. (The "hogging" occurs because the resistance of copper traces is of a low enough magnitude that currents become very high at even low voltages, in this case distributing all of the available current into a path designed to handle only half of the unavailable current.)

It would be desirable for future servers to receive the 12 volt DC supply voltage via a pair of edge connector pins that are connected to the back plane, each server being supplied by its own hot swap controller. However, a problem in achieving this goal arises when edge connector pins have a mismatch in voltage. For example, a 42 millivolt difference between the two pins means that a single pin would carry essentially the entire current. It would be desirable to have a means to ensure that the total load current is equally shared between two or more connector pins.

The most common and useful prior methods of current sharing have simply introduced sufficient ballast resistance into the multiple feeds paths of a circuit to reduce mismatch in the output voltage of each power supply, etc. to acceptable levels. For example, use of source ballast resistors or emitter ballast resistors is common in transistor circuits to enhance the needed current sharing and prevent current hogging. However, all of these prior art load current sharing methods incur excessive losses in this system when they use values of resistance that accomplish an acceptable amount of current sharing.

There is an unmet need for a controller circuit which can provide approximately equal load current sharing among multiple power-supplying elements without using ballast resistors.

There also is an unmet need for a hot swap controller which can achieve approximately equal load current sharing and can also provides substantially reduced power dissipation compared to hot swap controllers of the prior art.

There also is an unmet need for a hot swap controller which can achieve approximately equal load current sharing without using ballast resistors.

There also is an unmet need for a hot swap controller which substantially reduces current hogging among parallel-coupled hot swap controllers and at the same time substantially reduces the amount of wasted power dissipation compared to the amount of power wasted in prior parallel-coupled hot swap controllers.

SUMMARY OF THE INVENTION

It is an object of the invention to provide a controller circuit which can provide approximately equal load current sharing among multiple power-supplying elements without using ballast resistors.

It is another object of the invention to provide a hot swap controller which can achieve approximately equal load current sharing and can also provides substantially reduced power dissipation compared to hot swap controllers of the prior art.

It is another object of the invention to provide a hot swap controller which can achieve approximately equal load current sharing without using ballast resistors.

It is another object of the invention to provide a hot swap controller which substantially reduces current hogging among parallel-coupled hot swap controllers and at the same time substantially reduces the amount of wasted power dissipation compared to the amount of power wasted in prior parallel-coupled hot swap controllers.

Briefly described, and in accordance with one embodiment, the present invention provides a hot swap controller includes a shunt resistor (32-1,2) and a power transistor (37-1,2) having a source coupled to a load maintains the first power transistor in a fully-turned-on condition to cause it to deliver a load current contribution ($I_{L1,2}$) which flows through the shunt resistor and the power transistor to the load (25). Current sensing circuitry (35-1,2) produces a first control signal ($V_{45-1,2}$-$V_{47-1,2}$) equal to the difference between a DC component ($V_{47-1}$) proportional to a first load current contribution ($I_{L1}$) flowing in the first shunt resistor and a feedback-based component ($V_{45-1}$). A control amplifier (49-1,2) produces a second control signal ($V_{51-1,2}$) in response to the first control signal to modify a drive signal (53-1) to the power transistor so as to reduce a channel resistance of the power transistor if the first control signal exceeds a predetermined level.

In one embodiment, the invention provides a power controlling circuit (30-1) including a first power transistor (37-1) having a first electrode and a second electrode, one of the first and second electrodes being coupled to a load (25) and the other of the first and second electrodes being coupled to a first terminal (36-1) of a first shunt resistor (32-1) having a second terminal coupled to receive a supply voltage ($V_{DC}$), and a first voltage source circuit (52-1) having an output (53-1) coupled to a control electrode of the first power transistor (37-1) and operable to maintain the first power transistor (37-1) in a fully-turned-on condition. A first current sensing circuit (35-1) coupled to the first shunt resistor (32-1) produces a first control signal ($V_{45-1}$) and a second control signal ($V_{47-1}$) each proportional to the difference between a DC component ($V_{47-1}$) proportional to a first load current contribution ($I_{L1}$) flowing in the first shunt resistor (32-1) and a feedback-based component ($V_{45-1}$). A first control amplifier (49-1) produces a third control signal ($V_{51-1}$) in response to a difference between the first control signal ($V_{45-1}$) and the second control signal ($V_{47-1}$), wherein the third control signal ($V_{51-1}$) overrides the output (53-1) of the first voltage source circuit (52-1) if the difference exceeds a predetermined level, so as to increase a channel resistance of the first power transistor (37-1). In the described embodiments, the first power transistor (37-1) is a MOS field effect transistor, the first electrode is a source, the second electrode is a drain, the control electrode is a gate, and the resistance of the first power transistor (37-1) is a channel resistance.

In the described embodiments, the first power transistor (37-1), first voltage source circuit (52-1), first current sensing circuit (35-1) and first control amplifier (49-1) are included in a first hot swap controller (30-1). The first current sensing circuit (35-1) includes a first current sensing resistor (34-1) having a first terminal coupled to receive the supply voltage ($V_{DC}$), a first sensing amplifier (43-1) having a first input (−) coupled to a second terminal (41-1) of the first current sensing resistor (34-1) and a second input (+) coupled to the first terminal (36-1) of the first shunt resistor (32-1). A first control transistor (42-1) has a source coupled to the second terminal (41-1) of the first current sensing resistor (34-1), a gate coupled to an output of the first sensing amplifier (43-1), and a drain coupled to a first terminal (45-1) of a first load resistor (46-1) and a first input (−) of the first control amplifier (49-1). The first current sensing circuit (35-1) includes a second current sensing resistor (33-1) having a first terminal coupled to receive the supply voltage ($V_{DC}$), a second control transistor (39-1) having a source coupled to a second terminal (38-1) of the second current sensing resistor (33-1), a gate coupled to an output of the first sensing amplifier (43-1), and a drain coupled to a first terminal (47-1) of a second load resistor (48-1) and a second input (+) of the first control amplifier (49-1). The first (−) and second (+) inputs of the first sensing amplifier (43-1) can be inverting and non-inverting inputs, respectively, and wherein first (−) and second (+) inputs of the first control amplifier (49-1) can be inverting and non-inverting inputs, respectively.

In one embodiment, the first hot swap controller (30-1) includes a first diode (50-1) having an anode coupled to the gate of the first power transistor (37-1) and a cathode coupled to receive the second control signal ($V_{51-1}$).

In one embodiment, a second hot swap controller (30-2) is substantially similar to the first hot swap circuit (30-1), and a current sharing control conductor (47) is coupled between the second input (+) of the first control amplifier (49-1) and the second input (−) of a second control amplifier (49-2) included in the second hot swap circuit (30-2). The second hot swap controller (30-2) includes a second power transistor (37-2) having a source coupled to the load (25) and a drain coupled to a first terminal (36-2) of a second shunt resistor (32-2) having a second terminal (31-2) coupled to receive the supply voltage ($V_{DC}$), a second voltage source circuit (52-2) having an output (53-2) coupled to a gate of the second power transistor (37-2) and operable to maintain the second power transistor (37-2) in a fully-turned-on condition, a second current sensing circuit (35-2) coupled to the second shunt resistor (32-2) for producing a fourth control signal ($V_{45-2}$) and a fifth control signal ($V_{47-2}$) each proportional to a second load current contribution ($I_{L2}$) flowing in the second shunt resistor (32-2), and a second control amplifier (49-2) for producing sixth control signal ($V_{51-2}$) in response to a difference between the fourth control signal ($V_{45-2}$) and the fifth control signal ($V_{47-2}$), wherein the sixth control signal ($V_{51-2}$) over the output (53-2) of the second voltage source circuit (52-2) if the difference between the fourth control signal ($V_{45-2}$) and the fifth control signal ($V_{47-2}$) exceeds the predetermined level, so as to reduce a channel resistance of the second power transistor (37-2). The second current sensing circuit (35-2) includes a third current sensing resistor (34-2) having a first terminal coupled to receive the supply voltage ($V_{DC}$), a second sensing amplifier (43-2) having a first input (−) coupled to a second terminal (41-2) of the third current sensing resistor (34-2) and a second input (+) coupled to the first terminal (36-2) of the third shunt resistor (32-2), a third control transistor (42-2) having a source coupled to the second terminal (41-2) of the third current sensing resistor (34-2), a gate coupled to an output of the second sensing amplifier (43-2), and a drain coupled to a first terminal (45-2) of a third load resistor (46-2) and a first input (−) of the second control amplifier (49-2). The second current sensing circuit (35-2) includes a fourth current sensing resistor (33-2) having a first terminal coupled to receive the supply voltage ($V_{DC}$), a second control transistor (39-2) having a source coupled to a second terminal (38-2) of the fourth current sensing resistor (33-1), a gate coupled to an output of the second sensing amplifier (43-2), and a drain coupled to a first terminal of a fourth load resistor (48-2) and a second input (+) of the second control amplifier (49-2), and a second diode (50-2) having an anode coupled to the gate of the second power transistor (37-2) and a cathode coupled to receive the sixth control signal ($V_{51-2}$).

In one embodiment of the invention, the first voltage source circuit includes a first charge pump (51-1). The current sharing control conductor (47) provides feedback from the second hot swap controller (30-2) to adjust the difference between the first control signal ($V_{45-1}$) and a second control signal ($V_{47-1}$) so as to cause the first control amplifier (49-1) to generate a value of the third control signal ($V_{51-1}$) that overrides the first charge pump circuit (52-1) and adjusts a voltage on the gate of the first power transistor (37-1) so as to cause the channel resistance of the first power transistor (37-1) to match a channel resistance of a corresponding second power transistor (37-2) of the second hot swap converter (30-2) if the fully-turned-on channel resistance of the first power transistor (37-1) is substantially less than a fully-turned-on channel resistance of the corresponding second power transistor (37-2).

In the described embodiment, the current sharing control conductor (47) provides feedback from one of the first (30-1) and second (30-2) hot swap controllers to cause lowering of the load current contribution ($I_{L1,2}$) of a stronger one of the first (30-1) and second (30-2) hot swap controllers. The second control signal ($V_{51-1}$) overrides the output (53-1) of the first voltage source circuit (52-1) by forward-biasing the first diode (52-1) if the difference between the first control signal ($V_{45-1}$) and the second control signal ($V_{47-1}$) exceeds the predetermined level, so as to increase a channel resistance of the first power transistor (37-1).

In one embodiment, the invention provides a method for controlling delivery of current from a source of a supply voltage ($V_{DC}$) through a shunt resistor (32-1,2) and a power transistor (37-1,2) having a source coupled to a load (25), including maintaining the first power transistor (37-1,2) in a fully-turned-on condition to cause it to deliver a load current contribution ($I_{L1,2}$) which flows from the source of the supply voltage ($V_{DC}$) through the shunt resistor (32-1,2) and the power transistor (37-1,2) to the load (25), producing a first control signal ($V_{45-1,2}$) and a second control signal ($V_{47-1,2}$) each proportional to the difference between a DC component ($V_{47-1}$) proportional to a first load current contribution ($I_{L1}$) flowing in the first shunt resistor (32-1) and a feedback-based component ($V_{45-1}$) by means of a current sensing circuit (35-1,2), and producing a third control signal ($V_{51-1,2}$) in response to the second control signal ($V_{45-1,2}$) by means of a control amplifier (49-1,2) and modifying a control voltage of the power transistor (37-1,2) so as to increase a channel resistance of the power transistor (37-1,2) if a difference between the first control signal ($V_{45-1,2}$) and the second control signal ($V_{47-1,2}$) exceeds a predetermined level. The power transistor (37-1,2) is maintained in the fully-turned-on condition by means of a charge pump circuit (52-1,2), and the second control signal (51-1,2) overrides the output (53-1,2) of the charge pump circuit (52-1,2) in order to increase a resistance of the power transistor (37-1,2) if the difference between the first control signal ($V_{45-1,2}$) and the second control signal ($V_{47-1,2}$) exceeds the predetermined level. The shunt resistor (32-1), power transistor (37-1), current sensing circuit (35-1), and control amplifier (49-1) are included in a first hot swap controller (30-1), wherein the method includes providing a second hot swap controller (30-2) substantially similar to the first hot swap controller (30-1) and coupling a current sharing control conductor (47) between a first input (47-1) of the control amplifier (49-1) of the first hot swap controller (30-1) and a first input (47-2) of the second control amplifier (49-2) of the second hot swap controller (30-2). In one embodiment, the method includes providing feedback from a weaker one of the first (30-1) and second (30-2) hot swap controllers to a stronger one of the first (30-1) and second (30-2) hot swap controllers so as to adjust the load current contribution of the stronger hot swap controller lowered to approximately equal the load current contribution ($I_{L1,2}$) of the weaker hot swap controller.

In one embodiment, the invention provides a system for controlling delivery of current from a source of a supply voltage ($V_{DC}$) through a shunt resistor (32-1,2) and a power transistor (37-1,2) having a source coupled to a load (25), including means (52-1,2) for maintaining the first power transistor (37-1,2) in a fully-turned-on condition to cause it to deliver a load current contribution ($I_{L1,2}$) which flows from the source of the supply voltage ($V_{DC}$) through the shunt resistor (32-1,2) and the power transistor (37-1,2) to the load (25), current sensing means (35-1,2) for producing a first control signal ($V_{45-12}$) and a second control signal ($V_{47-1,2}$) each proportional to the difference between a DC component ($V_{47-1}$) proportional to a first load current contribution ($I_{L1}$) flowing in the first shunt resistor (32-1) and a mismatch component ($V_{45-1}$) corresponding to a predetermined value, and control means (49-1,2) for producing a third control signal ($V_{51-1,2}$) in response to the second control signal ($V_{45-1,2}$) and modifying a control voltage of the power transistor (37-1,2) so as to increase a resistance of the power transistor (37-1,2) if a difference between the first ($V_{45-1,2}$) and second ($V_{47-1,2}$) control signals exceeds a predetermined level.

DETAILED DESCRIPTION OF THE PREFERRED EMBODIMENTS

The invention provides a structurally simple hot swap controller and technique for achieving effective parallel connection of two (or more) of the hot swap controllers in such a way as to cause them to deliver equal amounts of current to a common load with a reduced amount of wasted power dissipation compared to prior parallel-coupled hot-swap controllers. The "weaker" of the parallel-connected hot swap controllers (i.e., the one having the highest "on" resistance in its output power transistor) operates with its output transistor in a fully-turned-on mode, and the "stronger" of the parallel-connected hot swap controllers operates to adjust itself in response to current in the output transistor of the weaker hot swap controller so the stronger hot swap controller contributes only an amount of the load current equal to the contribution by the weaker hot swap controller. In a described embodiment, worst-case conditions result in a source-drain voltage drop across an output transistor of the weaker hot swap controller of less than approximately 40 millivolts with 40 amperes of load current being delivered to the load by that output transistor, and hence only 140 microwatts of wasted power dissipation.

Figure 1:
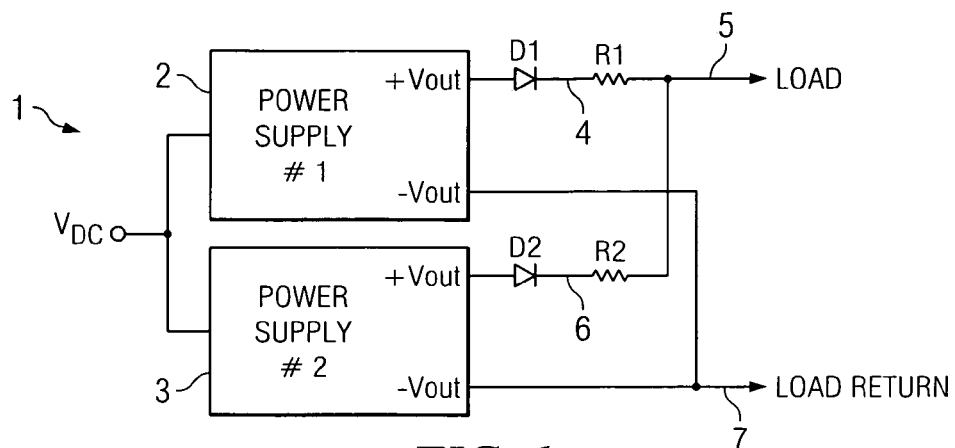
FIG. 1 is a schematic diagram of a prior art current sharing power controller.
Figure 3:
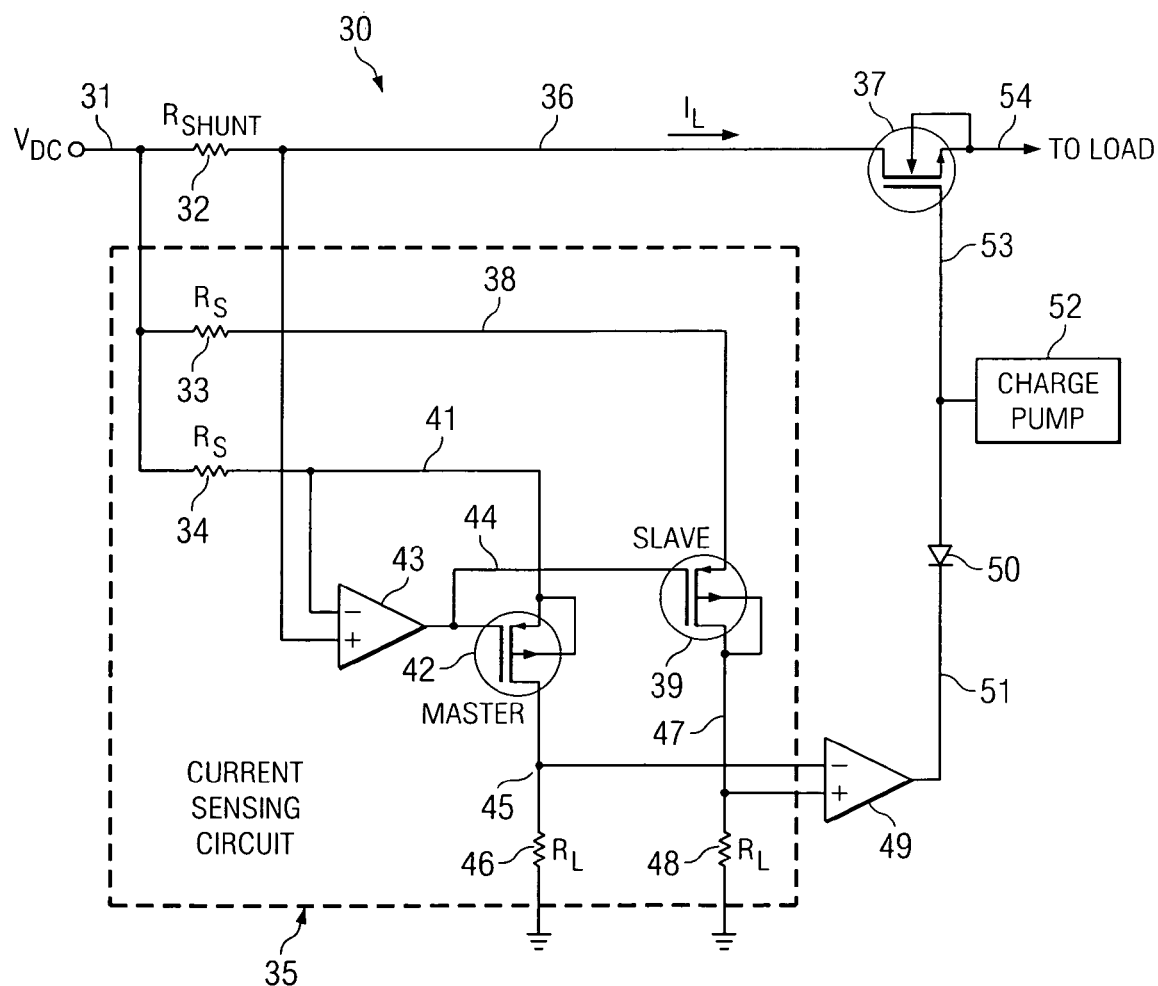
FIG. 3 is a schematic diagram of a single hot swap controller according to the present invention.

Referring to FIG. 3, a single hot swap controller 30 includes a main power supply terminal 31 which receives the main power supply voltage $V_{DC}$ and applies it to one terminal of each of shunt resistor 32 (which, for example, may have a resistance of 300 micro-ohms) and matching gain setting resistors 33 and 34 (which, for example, each may have a resistance of 100 ohms). A second terminal of shunt resistor 32 is connected by conductor 36 to the drain of a N-channel power transistor 37 and to the (+) input of an operational amplifier 43. The source and body electrodes of power transistor 37 are connected by output conductor 54 to a load (not shown). The gate of power transistor 37 is connected by conductor 53 to the output of a conventional charge pump 52 which is capable of maintaining a voltage of substantially larger magnitude than $V_{DC}$ to the gate of power transistor 37. Conductor 53 is also connected to the anode of a diode 50. A second terminal of resistor 34 is connected by conductor 41 to the (−) input of operational amplifier 43 and to the source and body electrodes of a P-channel transistor 42, the drain of which is connected by conductor 45 to one terminal of a load resistor 46, the other terminal of which is connected to ground (or other load return voltage conductor). A second terminal of resistor 33 is connected by conductor 38 to the (−) input of operational amplifier 43 and to the source and body electrodes of a P-channel transistor 39, the drain of which is connected by conductor 47 to one terminal of a load resistor 48, the other terminal of which is connected to ground. Load resistors 46 and 48 may have a resistance of, for example, 10,000 ohms.

Conductors 45 and 48 are also connected to the (−) and (+) inputs, respectively, of an operational amplifier or control amplifier 49, the output of which is connected by conductor 51 to the anode of diode 50. The output of operational amplifier 43 is connected by conductor 44 to the gates of transistors 42 and 39. The circuitry current including sensing resistors 33 and 34, operational amplifier 43, transistors 42 and 39, and load resistors 46 and 48 constitutes a current sensing circuit 35.

If hot swap controller 30 is not connected in parallel with another like hot swap controller, then output signals 45 and 47 of current sensing circuit 35 in FIG. 3 are essentially identical and are fed into control amplifier 49. The output of control amplifier 49 can only perform the function of turning power transistor 37 off by overriding the output of charge pump 52, which normally maintains a high voltage level on the gate of power transistor 37 and thereby causing it to be fully turned on. (Alternatively, some other high-impedance voltage source capable of providing sufficient gate voltage to power transistor 37 could be used instead of charge pump 52.) Preferably, control amplifier 49 has a designed-in offset voltage such that under normal conditions (i.e., when the voltages on conductors 45 and 47 are equal) power transistor 37 is fully turned on by charge pump 52 and diode 50 is reverse biased by control amplifier 49 thereby isolating power transistor 37 from current sensing circuitry 35. (Alternatively, the resistance of one of load resistors 46 and 48 could be adjusted to generate the needed offset.)

Operational amplifier 43 operates to keep its (+) and (−) input voltages equal so as to cause a current proportional to $I_L$ to flow through the path including current-sensing resistor 34, transistor 42, and load resistor 46 and also causes another current proportional to $I_L$ to flow through another path including current-sensing resistor 33, transistor 39, and load resistor 48. This produces equal voltages proportional to $I_L$ on conductors 45 and 48. Transistor 39 operates as a "current mirror".

Figure 2:
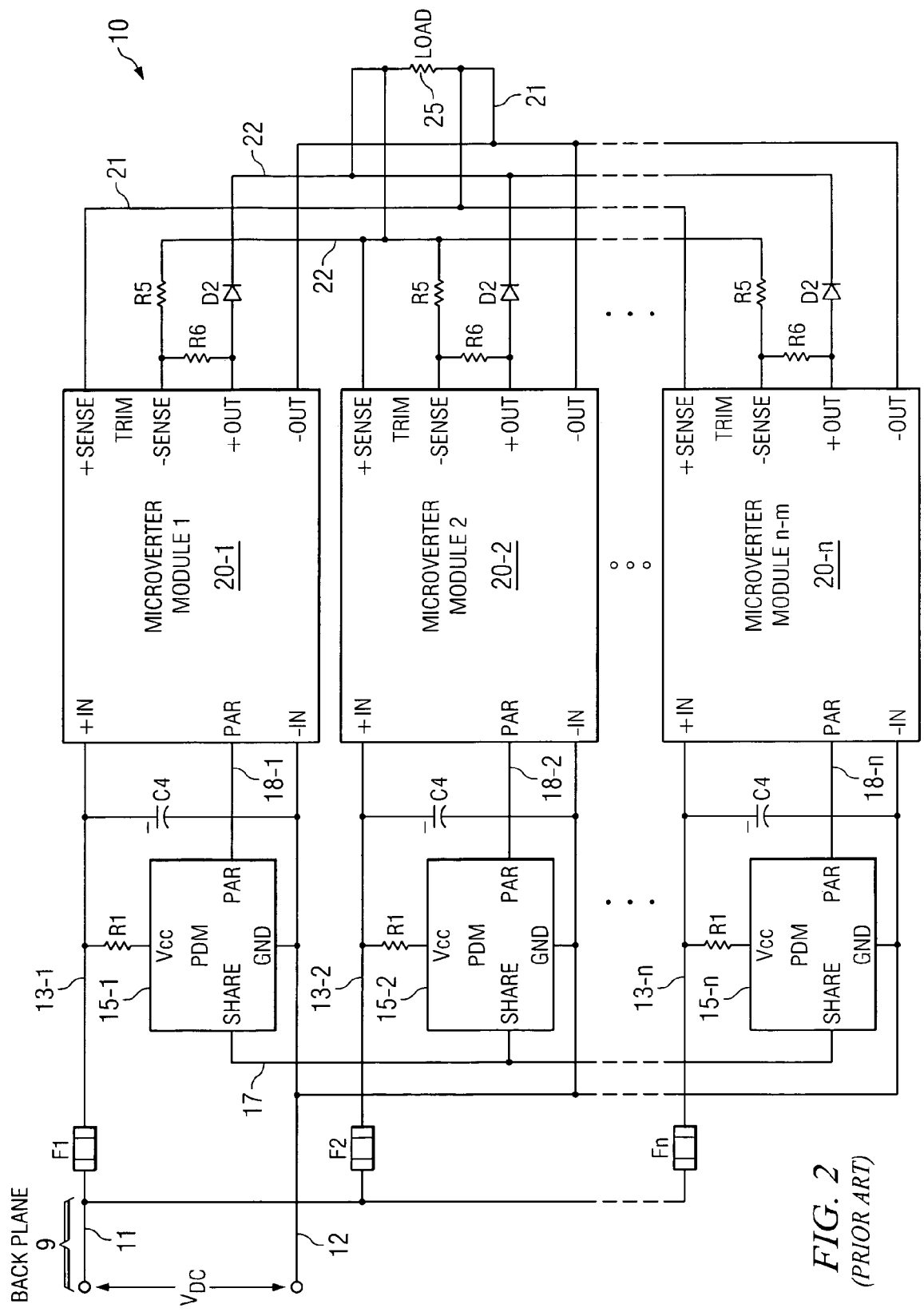
FIG. 2 is a block diagram of a n+1 redundant power supply system using multiple power supplies.
Figure 4:
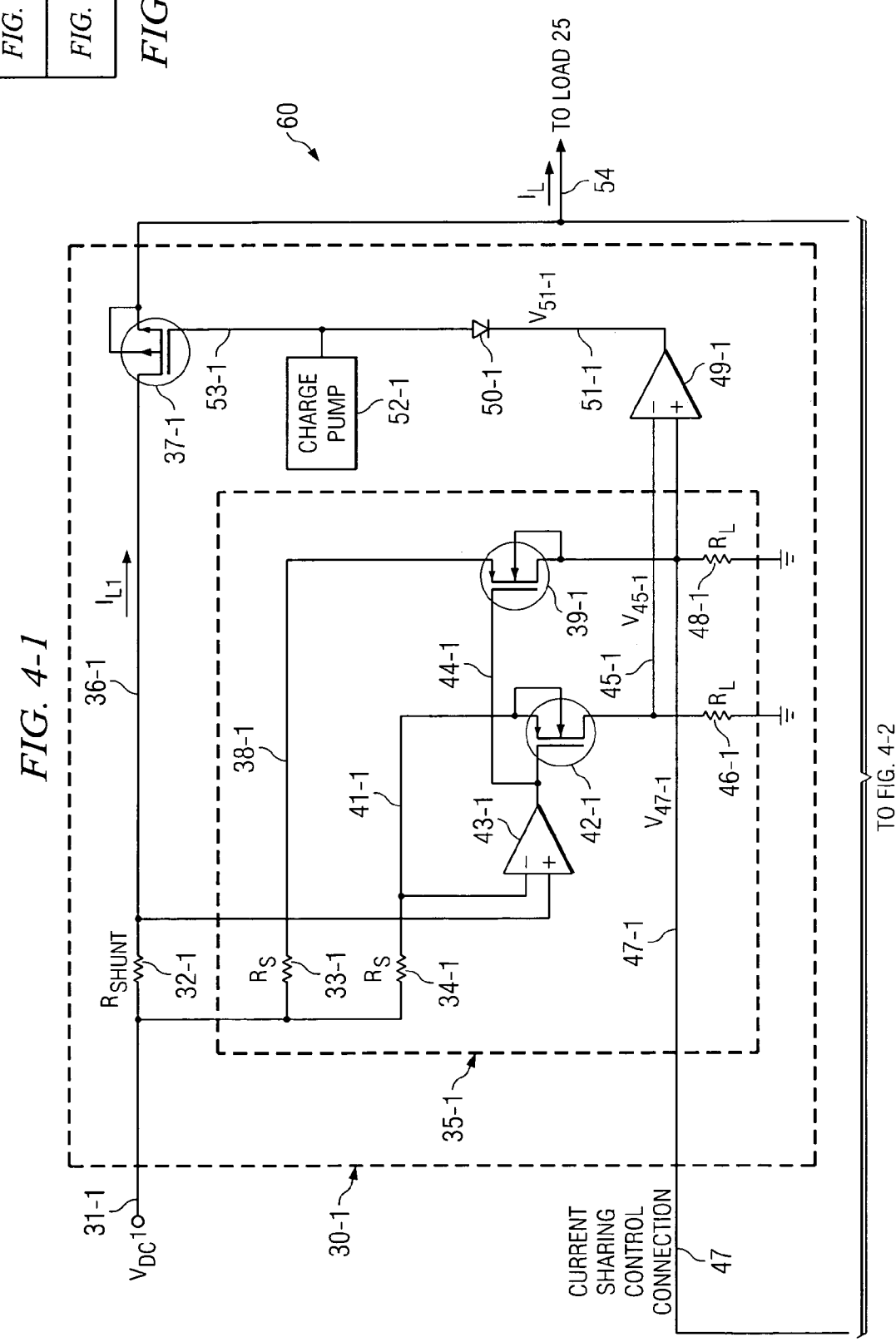
FIG. 4 is a schematic diagram of a system including two hot swap controllers as shown in FIG. 3.
Figures 2, 4:
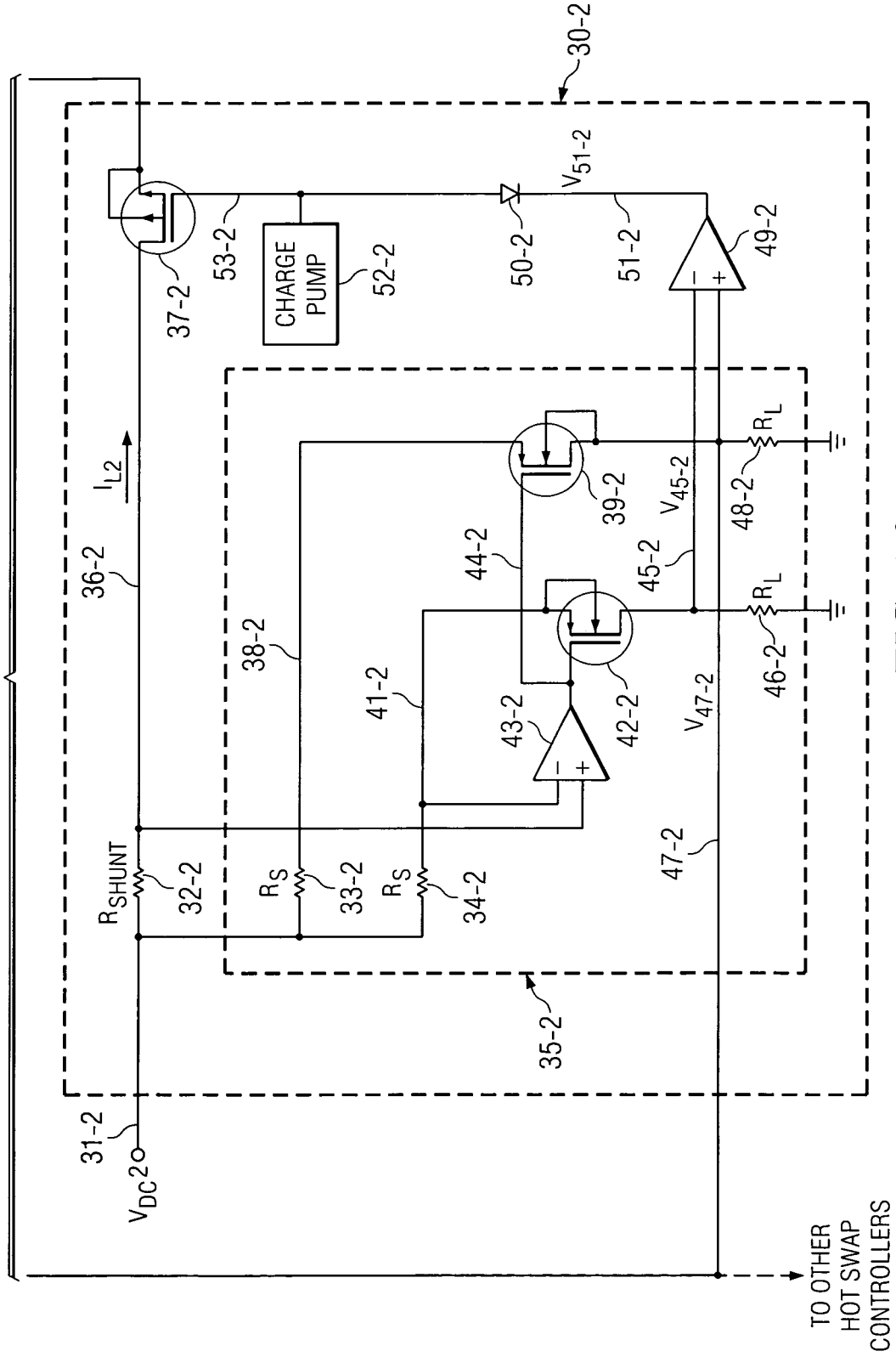

Referring to FIG. 4, a current sharing hot swap controller system 60 includes a first hot swap controller 30-1 identical to hot swap controller 30 of FIG. 3. Hot swap controller 30-1 is connected in parallel with a second hot swap controller 30-2 which also is identical to hot swap controller 30 of FIG. 3. Specifically, hot swap controller 30-1 includes a main power supply terminal 31-1 which can receive a first power supply voltage $V_{DC1}$ and applies it to one terminal of each of matched shunt resistor 32-1 and current sensing resistors 33-1 and 34-1. The second terminal of shunt resistor 32-1 is connected by conductor 36-1 to the drain of N-channel power transistor 37-1 and to the (+) input of operational amplifier 43-1. The source and body electrodes of power transistor 37-1 are connected by output conductor 54 to one terminal of a load 25 (e.g., as in FIG. 2). The gate of power transistor 37-1 is connected by conductor 53-1 to the output of conventional charge pump 52-1 which can apply a voltage of substantially larger magnitude than $V_{DC1}$ to the gate of power transistor 37-1. Conductor 53-1 also is connected to the anode of diode 50-1.

A second terminal of resistor 34-1 is connected by conductor 41-1 to the (−) input of operational amplifier 43-1 and to the source and body electrodes of P-channel transistor 42-1, the drain of which is connected by conductor 45-1 to one terminal of load resistor 46-1, the other terminal of which is connected to ground. The second terminal of resistor 33-1 is connected by conductor 38-1 to the source and body electrodes of P-channel transistor 39-1, the drain of which is connected by conductor 47-1 to one terminal of a load resistor 48-1, the other terminal of which is connected to ground. Conductors 45-1 and 48-1 are also connected to the (−) and (+) inputs, respectively, of control amplifier 49-1, the output of which is connected by conductor 51-1 to the anode of diode 50-1. The output of operational amplifier 43-1 is connected by conductor 44-1 to the gates of transistors 42-1 and 39-1. The circuitry including operational amplifier 43-1, transistors 42-1 and 39-1, and resistors 46-1 and 48-1 constitutes a first current sensing circuit 35-1.

Similarly, the second hot swap controller 30-2 includes main power supply terminal 31-2 which can receive a second power supply voltage $V_{DC2}$ (which can be the same as $V_{DC1}$) and applies it to one terminal of each of shunt resistor 32-2 and current sensing resistors 33-2 and 34-2. A second terminal of shunt resistor 32-2 is connected by conductor 36-2 to the drain of N-channel power transistor 37-2 and to the (+) input of an operational amplifier 43-2. The source and body electrodes of power transistor 37-2 are connected by output conductor 54 to a load (not shown). The gate of power transistor 37-2 is connected by conductor 53-2 to the output of conventional charge pump 52-2 which can apply a voltage of substantially larger magnitude than $V_{DC2}$ to the gate of power transistor 37-2. Conductor 53-2 also is connected to the anode of a diode 50-2. A second terminal of resistor 34-2 is connected by conductor 41-2 to the (−) input of operational amplifier 43-2 and to the source and body electrodes of P-channel transistor 42-2, the drain of which is connected by conductor 45-2 to one terminal of load resistor 46-2, the other terminal of which is connected to ground. The second terminal of resistor 33-2 is connected by conductor 38-2 to the source and body electrodes of P-channel transistor 39-2, the drain of which is connected by conductor 47-2 to one terminal of load resistor 48-2, the other terminal of which is connected to ground. Conductors 45-2 and 48-2 are also connected to the (−) and (+) inputs, respectively, of control amplifier 49-2, the output of which is connected by conductor 51-2 to the anode of diode 50-2. The output of operational amplifier 43-2 is connected by conductor 44-2 to the gates of transistors 42-2 and 39-2. The circuitry including current-sensing resistors 33-2 and 34-2, operational amplifier 43-2, transistors 42-2 and 39-2, and resistors 46-2 and 48-2 constitutes a second current sensing circuit 35-2.

When the two hot swap controllers 30-1 and 30-2 are connected by means of the simple single wire current sharing control conductor 47 between conductor 47-1 of hot swap controller 30-1 and conductor 47-2 of hot swap controller 30-2 as shown in FIG. 4, they are said to be connected in parallel. This makes it possible for the two hot-swap controllers 30-1 and 30-2 to equally contribute to, i.e., share, the total current delivered to load 25 even if the fully-turned-on channel resistance $R_{CH}$ of the power transistor 37-1 or 37-2 of one of the hot swap controllers, referred to as the "weaker" hot swap controller, is substantially greater than the corresponding fully-turned-on channel resistance $R_{CH}$ of the other hot-swap controller, which is referred to as the "stronger" hot swap controller.

Specifically, the conductor 47-1 or 47-2 of the "weaker" hot-swap controller (having the highest output transistor channel resistance $R_{CH}$) pulls the voltage of current sharing control conductor 47, which is connected to both of conductors 47-1 and 47-2, to a lower voltage level. This in effect produces the feedback from the shunt resistor of the weaker hot-swap controller so as to cause the output of the control amplifier 49-1 or 49-2 of the "stronger" hot-swap controller to assume whatever voltage is necessary to cause the load current contributions $I_{L1}$ and $I_{L2}$ of hot swap controllers 30-1 and 30-2, respectively, to be closely matched. Therefore, they contribute equally to the total current $I_{Ltotal}$ delivered to the load.

For example, assume that hot swap controller 30-1 is the stronger of the two, whereby hot swap controller 30-2 is the weaker one. Without feedback from shunt resistor 31-2 of weaker hot swap controller 30-2, N-channel power transistor 37-1 would be always fully turned on by charge pump 52-1. The output of amplifier 49-1 would be at its highest voltage level, and diode 50-1 would be always turned off such that current-sensing circuitry 30-1 in effect would be disconnected from power transistor 37-1. Assume that power transistor 37-2 is also turned on to its maximum extent by charge pump 52-2. Since power transistor 37-2 is weaker than power transistor 37-1 (for example, stronger power transistor 37-1 might have only a 10 millivolt voltage drop with 40 amperes flowing through it, while under identical conditions, weaker power transistor 37-2 might have a much larger 29 millivolt voltage drop), then transistor 37-1 would ordinarily "hog" all of the current $I_{Ltotal}$ being delivered to the load via output conductor 54, because the lower voltage drop directly represents a proportionally lower parallel resistance, and in any parallel resistance arrangement the current will divide in proportion to the resistances. That is, without the benefit of current sharing control conductor 47, the upper power transistor 37-1 would hog all of the total load current $I_{Ltotal}$ and therefore would deprive the lower power transistor 37-2 of any appreciable share of the total load current $I_{Ltotal}$.

The function of current sensing circuits 35-1 and 35-2 including amplifiers 43-1 and 43-2 and their associated pairs of transistors 42-1,45-1 and 42-2,45-2, respectively, with the two hot-swap controllers connected in parallel by means of current sharing control conductor 47, is that each of current sensing circuit 35-1 and 35-2 senses a voltage drop across its corresponding shunt resistor 32-1 and 32-2, respectively, caused by their respective load current contributions $I_{L1}$ and $I_{L2}$. Current sensing circuit 35-1 attempts to develop a corresponding signal on conductor 47-1 which is proportional to the sensed value of $I_{L1}$, and similarly, current sensing circuit 35-2 attempts to develop a corresponding signal between on conductor 47-2 which is proportional to the sensed value of $I_{L2}$.

When conductors 47-1 and 47-2 are connected together by means of current sharing control conductor 47, the initially high voltage of the (+) input of control amplifier 49-1 is pulled lower by the initially lower value of the (+) input of control amplifier 49-2. The voltage of current sharing control conductor 47, and hence the voltages of the (+) inputs of amplifiers 49-1 and 49-2, therefore assume a value approximately half-way between their "un-connected" voltage values. This arises because of the combination of the output from two similar current sources and identical resistors together will naturally assume a mean value. That overcomes the above mentioned built-in offset voltage of amplifier 49-1 and causes the output voltage of amplifier 49-1 to be reduced, which forward biases diode 53-1 and draws current through it, thereby reducing the gate voltage of N-channel transistor 37-1 and increasing its channel resistance $R_{CH}$ and accordingly reducing the value of $I_{L1}$. That in turn causes the voltage drop across shunt resistor 32-1 to decrease. Current sensing circuit 35-1 senses that reduction in current as an increase in the voltage on conductor 36-1, and a point of equilibrium will be reached at the point where the channel resistance $R_{CH}$ of power transistor 37-1 has been reduced to match the channel resistance of power transistor 37-2. Then the voltage drops across the power transistors 37-1 and 37-2 will be equal and their respective load current contributions $I_{L1}$ and $I_{L2}$ are equal.

It is important to remember that when these two current sensing circuits 35-1 and 35-2 are connected together by conductor 47, they are only capable of turning their respective power transistors 37-1 or 37-2 off, but are not capable of turning their respective power transistors on harder. So when control amplifier 49-2 receives a higher voltage on its (+) input, it cannot make its power transistor 37-2 turn on any harder. Conversely, the corresponding lower input voltage on the (+) input of control amplifier 49-1 is of a polarity such that it will "start" to turn power transistor 37-1 off, but it will only do so until the contributions of power transistors 37-1 and 37-2 such that P-channel transistor's 39-1 and 39-2 have identical source-drain currents. Under these conditions the upper hot swap controller 30-1 is operating in a linear, regulated, feedback mode holding its operating point at this point of equilibrium. In contrast, the lower hot swap controller 30-2 is still operating with its power transistor 37-2 fully turned on and is operating in an open loop mode rather than in a feedback mode. The key is that the stronger circuit, in this case the top one, is operating in a linear rather than saturated condition. At that point, the same 29 millivolt drop will occur across both of transistors 37-1 and 37-2.

Note that only the channel resistance of the stronger hot swap controller is automatically adjusted, and that automatic adjustment occurs so as to cause the channel resistance of the stronger hot swap controller to match the channel resistance of the weaker one. That enables hot-swap controllers 30-1 and 30-2 to equally share the total current $I_{Ltotal}$ delivered to the load with a minimum amount of wasted power dissipation.

In contrast, prior art parallel-coupled hot-swap controllers all would have incurred additional power loss in ballast resistances and/or diodes included with the parallel-coupled hot swap controllers in order to approximately equalize load current sharing between them. The present invention ensures that the total current delivered to the common load of a number of parallel-connected hot-swap controllers is equally shared between them without use of the previously mentioned ballast resistances of the prior art, and therefore avoids the large amount of wasted power dissipation in the ballast resistances.

To summarize, if two hot swap controllers are connected in parallel, the "strongest" one has the output transistor that is turned on the hardest and therefore has the lowest amount of field effect transistor channel resistance. As an example, without the benefit of the current sharing control conductor 47 and to the current-sensing circuits 35-1 and 35-2 of the present invention, a voltage difference as large as 42 millivolts between the voltage drops across the power transistors of the weakest hot-swap controller and the strongest one might cause the strongest one to "hog" all of the load current, i.e., deliver all of the load current to the common load. The current sharing control conductor 47 between the hot-swap controllers is such that the weakest one, i.e. the one which has the highest voltage drop across its power transistor, would be the one which does not have the operating point of its power transistor altered by the current sharing control conductor 47 between the two hot swap controllers. The imbalance between the stronger hot swap controller and the weaker hot swap controller is used as feedback to generate a compensating signal which is applied to the stronger hot swap controller so as to reduce the magnitude of the gate voltage of the power transistor of the stronger hot swap controller just enough that the source-to-drain voltage drop across the power transistor of the stronger hot swap controller matches the higher source-two-drain voltage drop across the power transistor of the weaker hot swap controller.

As an example, a conventional lossy current sharing arrangement would probably have to "drop" a minimum of 100 millivolts at a current of 40 amperes, and therefore waste or "consume" 4 watts, whereas an efficient system according to the present invention will not drop more than 30 millivolts at 40 amperes, and therefore not waste more than about 1.2 watts, which has a very substantial improvement since server he manufacturers are under great deal of pressure to reduce power consumption.

It should be noted that the low voltage drops across the power transistors also provides improved system voltage "head room" margins. The hot-swap controllers in FIG. 4 do not need to have exceedingly fast operation. Consequently, there is considerable freedom for providing compensation for any stability problems of a particular implementation.

Thus, the present invention provides hot swap controllers that can be connected in parallel so as to cause them to equally share/contribute to the current delivered to the load, and achieves this with minimum wasted power dissipation and with a simple circuit structure. Furthermore, the low voltage drops across the power transistors provide somewhat improved system voltage "head room" margins.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, the concept of the invention applies to hot-swap controllers including AC-DC converters, switching power supplies, or non-switching power supplies; the principle of operation is the same in every case. Although MOSFETs are used as the transistors in the described embodiments, in some cases it is possible to use other types of transistors.

What is claimed is:

1. A power controlling circuit comprising:
   first power transistor having a first electrode and a second electrode, one of the first and second electrodes being coupled to a load and the other of the first and second electrodes being coupled to a first terminal of a first shunt resistor having a second terminal coupled to receive a supply voltage;
   a first voltage source circuit having an output coupled to a control electrode of the first power transistor and operable to maintain the first power transistor in a fully-turned-on condition;
   a first current sensing circuit coupled to the first shunt resistor for producing a first control signal and a second control signal each proportional to a first load current contribution flowing in the first shunt resistor; and
   a first control amplifier for producing a third control signal in response to a difference between the first control signal and the second control signal, wherein the third control signal overrides the output of the first voltage source circuit if the difference exceeds a predetermined level, so as to increase a resistance of the first power transistor.

2. The power controlling circuit of claim 1 wherein the first power transistor is a MOS field effect transistor, the first electrode is a source, the second electrode is a drain, the control electrode is a gate, and the resistance of the first power transistor is a channel resistance.

3. The power controlling circuit of claim 2 wherein the first power transistor, first voltage source circuit, first current sensing circuit and first control amplifier are included in a first hot swap controller, and wherein the first current sensing circuit includes a first current sensing resistor having a first terminal coupled to receive the supply voltage, a first sensing amplifier having a first input coupled to a second terminal of the first current sensing resistor and a second input coupled to the first terminal of the first shunt resistor, a first control transistor having a source coupled to the second terminal of the first current sensing resistor, a gate coupled to an output of the first sensing amplifier, and a drain coupled to a first terminal of a first load resistor and a first input of the first control amplifier.

4. The power controlling circuit of claim 3 wherein the first current sensing circuit includes a second current sensing resistor having a first terminal coupled to receive the supply voltage, a second control transistor having a source coupled to a second terminal of the second current sensing resistor, a gate coupled to an output of the first sensing amplifier, and a drain coupled to a first terminal of a second load resistor and a second input of the first control amplifier.

5. The power controlling circuit of claim 4 for wherein the first and second inputs of the first sensing amplifier are inverting and non-inverting inputs, respectively, and wherein the first and second inputs of the first control amplifier are inverting and non-inverting inputs, respectively.

6. The power controlling circuit of claim 5 wherein the first hot swap controller includes a first diode having an anode coupled to the gate of the first power transistor and a cathode coupled to receive the third control signal.

7. The power controlling circuit of claim 6 wherein the third control signal overrides the output of the first voltage source circuit by forward-biasing the first diode if the difference between the first control signal and the second control signal exceeds the predetermined level, so as to increase a channel resistance of the first power transistor.

8. The power controlling circuit of claim 4 including a second hot swap controller substantially similar to the first hot swap circuit, and further including a current sharing control conductor coupled between the second input of the first control amplifier and a second input of a second control amplifier included in the second hot swap circuit.

9. The power controlling circuit of claim 8 wherein the second hot swap controller includes a second power transistor having a source coupled to the load and a drain coupled to a first terminal of a second shunt resistor having a second terminal coupled to receive the supply voltage, a second voltage source circuit having an output coupled to a gate of the second power transistor and operable to maintain the second power transistor in a fully-turned-on condition, a second current sensing circuit coupled to the second shunt resistor for producing a fourth control signal and a fifth control signal each proportional to a second load current contribution flowing in the second shunt resistor, and a second control amplifier for producing a sixth control signal in response to a difference between the fourth control signal and the fifth control signal, wherein the sixth control signal overrides the output of the second voltage source circuit if the difference between the fourth control signal and the fifth control signal exceeds the predetermined level, so as to increase a channel resistance of the second power transistor.

10. The power controlling circuit of claim 9 wherein the second current sensing circuit includes a third current sensing resistor having a first terminal coupled to receive the supply voltage, a second sensing amplifier having a first input coupled to a second terminal of the third current sensing resistor and a second input coupled to the first terminal of the third shunt resistor, a third control transistor having a source coupled to the second terminal of the third current sensing resistor, a gate coupled to an output of the second sensing amplifier, and a drain coupled to a first terminal of a third load resistor and a first input of the second control amplifier.

11. The power controlling circuit of claim 10 wherein the second current sensing circuit includes a fourth current sensing resistor having a first terminal coupled to receive the supply voltage, a second control transistor having a source coupled to a second terminal of the fourth current sensing resistor, a gate coupled to an output of the second sensing amplifier, and a drain coupled to a first terminal of a fourth load resistor and a second input of the second control amplifier, and a second diode having an anode coupled to the gate of the second power transistor and a cathode coupled to receive the sixth control signal.

12. The power controlling circuit of claim 11 wherein the first and second power transistors are N-channel MOSFETs and the first, second, third and fourth control transistors are P-channel MOSFETs.

13. The power controlling circuit of claim 3 including a second hot swap controller substantially similar to the first hot swap circuit, and further including a current sharing control conductor coupled between the second input of the first control amplifier and a second input of a second control amplifier included in the second hot swap circuit.

14. The power controlling circuit of claim 13 wherein the first voltage source circuit includes a first charge pump, and the current sharing control conductor provides feedback from the second hot swap controller to adjust the difference between the first control signal and the second control signal so as to cause the first control amplifier to generate a value of the third control signal that overrides the first charge pump circuit and adjusts a voltage on the gate of the first power transistor so as to cause the channel resistance of the first power transistor to match a channel resistance of a second power transistor of the second hot swap converter if a fully-turned-on channel resistance of the first power transistor is substantially less than a fully-turned-on channel resistance of the second power transistor.

15. The power controlling circuit of claim 13 wherein the current sharing control conductor provides feedback from one of the first and second hot swap controllers to cause lowering of the load current contribution of a stronger one of the first and second hot swap controllers.

16. An apparatus comprising:
a supply terminal;
a load terminal;
a shunt resistor that is coupled to the supply terminal;
a power transistor having a first passive electrode, a second passive electrode, and a control electrode, wherein the first passive electrode of the power transistor is coupled to the shunt resistor, and wherein the second passive electrode of the power transistor is coupled to the load terminal;
a voltage source that is coupled to the control electrode of the power transistor;
a current sensing circuit having a first input terminal, a second input terminal, a first output terminal, and a second output terminal, wherein first and second input terminals are coupled across the shunt resistor, and wherein the first output terminal of the current sensing circuit outputs a first control signal that is proportional to the current flowing through the shunt resistor, and wherein the second output terminal of the current sensing circuit outputs a second control signal that is proportional to the current flowing through the shunt resistor; and
an amplifier having a first input terminal, a second input terminal, and an output terminal, wherein the first input terminal of the amplifier is coupled to the first output terminal of the current sensing circuit, and wherein the second input terminal of the amplifier is coupled to the second output terminal of the current sensing circuit, and wherein the output terminal of the amplifier is coupled to the control electrode of the power transistor.

17. The apparatus of claim 16, wherein the amplifier further comprises a first amplifier, and wherein the current sensing circuit further comprises:
a first sensing resistor that is coupled to the supply terminal;
a second sensing resistor that is coupled to the supply terminal;
a master transistor having a first passive electrode, a second passive electrode, and a control electrode, wherein the first passive electrode of the master transistor is coupled to the first sense resistor, and wherein the second passive electrode of the master transistor is coupled to the first input terminal of the first amplifier;
a slave transistor having a first passive electrode, a second passive electrode, and a control electrode, wherein the first passive electrode of the slave transistor is coupled to the second sense resistor, and wherein the second passive electrode of the slave transistor is coupled to the second input terminal of the first amplifier; and
a second amplifier having a first input terminal, a second input terminal, and an output terminal, wherein the first input terminal of the second amplifier is coupled to the shunt resistor, and wherein the second input terminal of the second amplifier is coupled to the first sense resistor, and wherein the output terminal of the second amplifier is coupled to the control electrodes of the master and slave transistors.

18. The apparatus of claim 17, wherein the current sensing circuit further comprises:
- a first load resistor that is coupled to the second passive electrode of the master transistor; and
- a second load resistor that is coupled to the second passive electrode of the slave transistor.

19. The apparatus of claim 18, wherein the power transistor, the master transistor, and the slave transistor further comprise a NMOS transistor, a PMOS transistor, and a PMOS transistor, respectively.

20. An apparatus comprising:
- a supply terminal;
- a load terminal; and
- a plurality of controllers that are coupled in parallel with one another between the supply terminal and the load terminal, wherein each controller includes:
  - a shunt resistor that is coupled to the supply terminal;
  - a power transistor having a first passive electrode, a second passive electrode, and a control electrode, wherein the first passive electrode of the power transistor is coupled to the shunt resistor, and wherein the second passive electrode of the power transistor is coupled to the load terminal;
  - a voltage source that is coupled to the control electrode of the power transistor;
  - a current sensing circuit having a first input terminal, a second input terminal, a first output terminal, and a second output terminal, wherein first and second input terminals are coupled across the shunt resistor, and wherein the first output terminal of the current sensing circuit outputs a first control signal that is proportional to the current flowing through the shunt resistor, and wherein the second output terminal of the current sensing circuit outputs a second control signal that is proportional to the current flowing through the shunt resistor; and
  - an amplifier having a first input terminal, a second input terminal, and an output terminal, wherein the first input terminal of the amplifier is coupled to the first output terminal of the current sensing circuit, and wherein the second input terminal of the amplifier is coupled to the second output terminal of the current sensing circuit, and wherein the output terminal of the amplifier is coupled to the control electrode of the power transistor.

21. The apparatus of claim 20, wherein the amplifier further comprises a first amplifier, and wherein the current sensing circuit further comprises:
- a first sensing resistor that is coupled to the supply terminal;
- a second sensing resistor that is coupled to the supply terminal;
- a master transistor having a first passive electrode, a second passive electrode, and a control electrode, wherein the first passive electrode of the master transistor is coupled to the first sense resistor, and wherein the second passive electrode of the master transistor is coupled to the first input terminal of the first amplifier;
- a slave transistor having a first passive electrode, a second passive electrode, and a control electrode, wherein the first passive electrode of the slave transistor is coupled to the second sense resistor, and wherein the second passive electrode of the slave transistor is coupled to the second input terminal of the first amplifier; and
- a second amplifier having a first input terminal, a second input terminal, and an output terminal, wherein the first input terminal of the second amplifier is coupled to the shunt resistor, and wherein the second input terminal of the second amplifier is coupled to the first sense resistor, and wherein the output terminal of the second amplifier is coupled to the control electrodes of the master and slave transistors.

22. The apparatus of claim 21, wherein the current sensing circuit further comprises:
- a first load resistor that is coupled to the second passive electrode of the master transistor; and
- a second load resistor that is coupled to the second passive electrode of the slave transistor.

23. The apparatus of claim 22, wherein the power transistor, the master transistor, and the slave transistor further comprise a NMOS transistor, a PMOS transistor, and a PMOS transistor, respectively.

* * * * *